United States Patent
Heinrich et al.

(10) Patent No.: US 9,527,069 B2
(45) Date of Patent: Dec. 27, 2016

(54) METHOD FOR COLD GAS SPRAYING

(71) Applicants: Peter Heinrich, Germering (DE);
Werner Krömmer, Landshut (DE);
Frank Gärtner, Hamburg (DE);
Thomas Klassen, Wentorf (DE);
Jan-Oliver Kliemann, Hamburg (DE);
Henning Gutzmann, Hamburg (DE);
Motohiro Yamada, Aichi (JP)

(72) Inventors: Peter Heinrich, Germering (DE);
Werner Krömmer, Landshut (DE);
Frank Gärtner, Hamburg (DE);
Thomas Klassen, Wentorf (DE);
Jan-Oliver Kliemann, Hamburg (DE);
Henning Gutzmann, Hamburg (DE);
Motohiro Yamada, Aichi (JP)

(73) Assignee: Linde Aktiengesellschaft, Munich (DE)

(*) Notice: Subject to any disclaimer, the term of this patent is extended or adjusted under 35 U.S.C. 154(b) by 236 days.

(21) Appl. No.: 14/369,002

(22) PCT Filed: Jan. 17, 2013

(86) PCT No.: PCT/EP2013/000121
§ 371 (c)(1),
(2) Date: Jun. 26, 2014

(87) PCT Pub. No.: WO2013/110441
PCT Pub. Date: Aug. 1, 2013

(65) Prior Publication Data
US 2014/0336046 A1    Nov. 13, 2014

(30) Foreign Application Priority Data

Jan. 24, 2012 (DE) .................. 10 2012 001 361
Apr. 24, 2012 (EP) ..................... 12002885

(51) Int. Cl.
*C23C 24/08* (2006.01)
*B01J 37/02* (2006.01)
(Continued)

(52) U.S. Cl.
CPC ........... *B01J 37/0221* (2013.01); *B01J 21/063* (2013.01); *B01J 35/004* (2013.01);
(Continued)

(58) Field of Classification Search
CPC ............. C23C 4/06; C23C 4/12; C23C 4/04; C23C 24/04; C23C 24/08; C23C 24/082; B05B 7/162; B05B 7/1486; B01J 37/0221
See application file for complete search history.

(56) References Cited

U.S. PATENT DOCUMENTS

2007/0110919 A1* 5/2007 Ballhorn ............... C23C 24/04
427/569

FOREIGN PATENT DOCUMENTS

DE   10 2009 012003 A1   9/2010
WO   WO 03/027348 A2   4/2003
(Continued)

*Primary Examiner* — Melvin C Mayes
*Assistant Examiner* — Smita Patel
(74) *Attorney, Agent, or Firm* — Philip H. Von Neida

(57) ABSTRACT

The invention relates to a method for cold gas spraying in which a spray powder containing photocatalytically active spray particles is accelerated by means of a carrier gas in a nozzle and forms a coating upon striking a substrate. According to the invention, the method is characterized in that at least one part of the photocatalytically active spray particles consists of nanocrystalline agglomerates having a porosity of 200 to 800 $m^2/g$, the porosity being determined by means of a BHT measurement with nitrogen. Coatings produced with the method according to the invention and objects having such a coating are also claimed.

22 Claims, 1 Drawing Sheet

(51) Int. Cl.
  *C23C 24/04* (2006.01)
  *B01J 21/06* (2006.01)
  *B01J 35/00* (2006.01)
  *C01G 23/047* (2006.01)
  *B05B 7/16* (2006.01)

(52) U.S. Cl.
  CPC ............ *B05B 7/162* (2013.01); *C01G 23/047* (2013.01); *C23C 24/04* (2013.01); *C23C 24/08* (2013.01); *C23C 24/082* (2013.01); *B01J 2208/00761* (2013.01)

(56) References Cited

FOREIGN PATENT DOCUMENTS

| WO | WO 2005079209 A2 * | 9/2005 | ............ C23C 24/04 |
|----|-------|--------|-----|
| WO | WO 2011/132286 A1 | 10/2011 | |

* cited by examiner

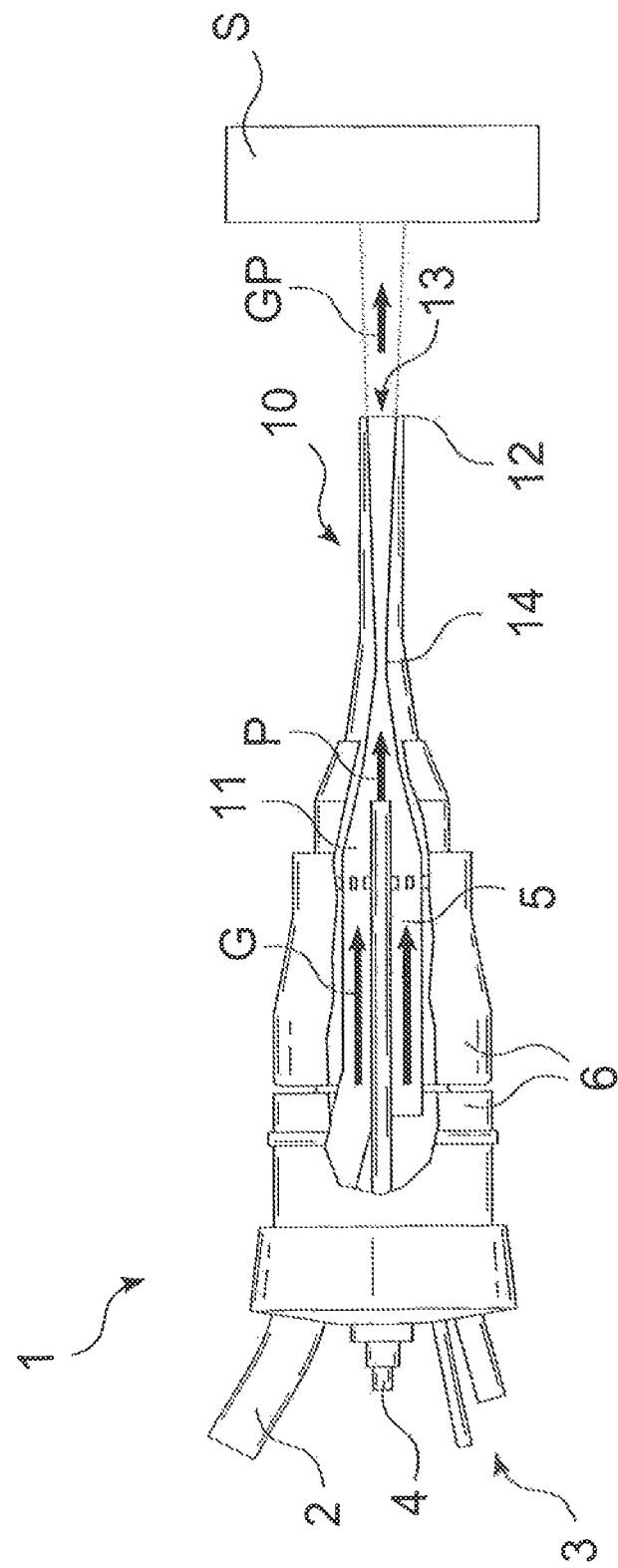

METHOD FOR COLD GAS SPRAYING

CROSS-REFERENCE TO RELATED APPLICATIONS

This application claims priority under 35 U.S.C. §119 to International Patent Application No. PCT/EP2013/000121 filed in the European Patent Office on Jan. 17, 2013, which claims priority from European Patent Application No. 12002885.7 filed on Apr. 24, 2012, which claims priority from German Patent Application 102012001361.2 filed on Jan. 24, 2012.

BACKGROUND OF THE INVENTION

The invention relates to a method for cold gas spraying, in which a spray powder containing photocatalytically active spray particles is accelerated in a nozzle by means of a carrier gas and forms a coating upon impact with a substrate. The invention further relates to coatings and objects with the coating.

In cold gas spraying methods, metallic spray particles are typically accelerated to high speeds in a relatively cold gas flow, a carrier gas, so that they form a coating upon striking a substrate or work piece because the particles are plastically deformed upon impact. In order to ensure that a coating is formed, the particles must be travelling at a minimum speed upon impact. The carrier gas and particles are generally accelerated in a Laval nozzle. The carrier gas is often heated, because the particles become ductile in the hot carrier gas, which favours coating formation upon impact. In addition, higher carrier gas velocities are achieved. However, it is important to ensure that the spray particles do not begin to melt. The temperature of the carrier gas is therefore relatively low, and consequently the procedure is called cold gas spraying or kinetic spraying.

There are various methods for producing photocatalytically active coatings. Such coatings have a catalytic effect when exposed to incident light. This is demonstrated for example in an anti-bacterial or anti-viral effect or also the initiation of redox reactions. Thus, disinfection and cleaning are possible in which pollutants are removed and bacteria and viruses eliminated. By doping the titanium dioxide, for example, it is possible to achieve an effect according to which a titanium dioxide coating that is normally photocatalytically active in UV light also becomes active in visible light.

European Patent EP 2 302 099 describes procedure for coating objects associated with sanitation, cooking or medicine by cold spraying with photocatalytically active titanium dioxide. European Patent EP 1 785 508 discloses cold gas spraying of photocatalytically active titanium dioxide, wherein the spraying powder consists of photocatalytically active titanium dioxide with a metal component. In German Patent DE 10 2004 038 795, the production of photocatalytically active plastic surfaces by cold gas spraying is described. Japanese Patent JP2009066594 also discloses a method for cold gas spraying of photocatalytically active titanium dioxide that has been doped with nitrogen, carbon or sulphur, so that it is photocatalytically active in visible light. Cold gas spraying of titanium dioxide is also disclosed in Chinese Patent CN1443071.

In the article "Deposition of $TiO_2$ Ceramic Particles on Cold Spray Process" by M. Yamada. et al. in DVB 264, 172-176, 2010, cold gas spraying of titanium dioxide is described in which mostly primary nanoparticles are used.

Cold as spraying of photocatalytically active titanium dioxide is described in the article "Formation of $TiO_2$ photocatalyst through cold spraying" by C. -J. Li et al., IEEE Conference on Intelligent Transportation, ITSC Proceedings, 10 May 2004, pages 1-5. Such a method is also described by J. -O. Kliemann et al. in "Layer formation of cold-sprayed ceramic titanium dioxide layers on metal surfaces", DVB 264, 90-85, 2010.

Cold gas spraying of photocatalytically active coatings is also described in EP 2 257 656. In this case, a matrix material with nanocrystalline titanium dioxide is used as the spray powder, and the photocatalytic activity is shifted into the visible spectrum by irradiating the processing site with UV or laser light while the cold gas spraying procedure is being carried out.

SUMMARY OF THE INVENTION

According to the invention, a method for cold gas spraying is suggested, in which a spray powder containing photocatalytically active spray particles is accelerated in a nozzle by means of a carrier gas, and forms a coating upon impact with a substrate, characterized in that at least a part of the photocatalytically active spray particles consists of nanocrystalline agglomerates that have a porosity from 200 to 800 $m^2/g$, wherein the porosity is determined by a BET measurement using nitrogen.

Surprisingly, it has been found that very good quality coatings are obtained with the inventive method. The coatings are characterized by good photocatalytic activity. Moreover, they manifest only little wear and good resistance to scratches and other signs of wear during use. In addition, the coatings advantageously have a rich yellow colour, so it is immediately apparent that the coatings absorb some visible light. With the method according to the invention, it is thus possible to produce photocatalytically active coatings of very high quality that in particular can also be excited by light wavelengths in the visible range, very economically. The photocatalytic activity of the spray particles, and particularly the photocatalytic activity in the visible light spectrum, is not suppressed by the inventive method, but surprisingly even increased. Astonishingly, this also applies for photocatalytic activity in visible light, which is destroyed very easily at higher temperatures, such as are used in cold gas spraying, since such activity is based on a shift in the band structure of the electrons. The shift of the band structure in turn is usually advantageously achieved by doping with foreign atoms. The applicant assumes that this is probably due to the fact that in the method of the invention an interaction takes place between the carrier gas and the spray particles, which may result in the desired band shift. The process parameters during cold gas spraying in combination with the properties of the spray particles are probably of critical importance therefor.

The carrier gas is advantageously at a temperature above 400° C., preferably above 800° C., particularly preferably above 900° C. before the nozzle throat. Temperatures above 1000 ° C., or even higher than 1100° C. are possible. Despite the high temperature in the cold gas spray process, as a consequence of which the spray particles in the hot carrier gas are also heated, the photocatalytic activity of the spray particles is preserved, and photocatalytically active coatings can be sprayed. It has now been demonstrated that as the temperature of the carrier gas rises, the photocatalytic activity of the coating actually increases. This is the more surprising since it would be logical to assume that the particular properties of the spray particles would decrease as the temperature rose. Surprisingly, the carrier as may even have such a high temperature and a coating with good photocatalytic activity can still be created.

Nitrogen particularly advantageously as the carrier gas. Nitrogen is able to penetrate the nanocrystalline agglomerates because they are open-pored to nitrogen. Thus, relative to nitrogen the nanocrystalline agglomerates have a very large surface area. Consequently, nitrogen is able to accumulate in substantial quantities on the nanocrystals and interact with them. Now, since the temperature of the nitrogen and the sprayed particles is advantageously high (see previous paragraph), the reaction between the nitrogen and the nanocrystallites is strongly favoured. Surprisingly, it has now been shown that the reaction takes place in such manner that the form of nanocrystallites occurs that is photocatalytically active, and photocatalytically active even in visible light, despite the high temperature during the cold gas spraying process.

Alternatively, helium may be used as the carrier gas. The use of this carrier gas has also been found to be particularly advantageous in experiments.

In order to combine the advantages helium with the advantages of nitrogen as the carrier gas, mixtures of the two gases can also be used advantageously as the carrier gas. In this case, the price of the carrier gas may also be influenced positively, since increasing the proportion of nitrogen in a mixture used as the carrier gas, the rest of which consists of helium, typically has the effect of lowering the price thereof.

The nanocrystalline agglomerates advantageously contain titanium dioxide ($TiO_2$), tungsten trioxide ($WO_3$), strontium titanate ($SrTiO_3$), tin dioxide ($SnO_2$), silicon carbide (SiC), sodium tantalum oxide (NaTaO), zinc oxide (ZnO), alpha ferric oxide ($\alpha$-$Fe_2O_3$), bismuth vanadate ($BiVO_4$), tantalum oxynitride (TaON), (III)tantalum(V)nitride ($Ta_3N_5$), indiumtantalum(IV) oxide ($InTaO_4$) and/or indium niobium(IV) oxide ($InNbO_4$), Particularly preferred of these is titanium dioxide ($TiO_2$), particularly in the form of antase. These compounds have photocatalytic activity, in particular photocatalytic activity in visible light. When these compounds used in the process according to the invention, it is revealed that the photocatalytic activity thereof, particularly their photocatalytic activity in visible light, is retained and more often than not actually enhanced despite the burden they are expose to as spray particles in cold gas spraying.

Titanium dioxide in the anatase modification begins to change into the rutile modification at a temperature above 700° C., and the change is accelerated as the temperature increases further. However, rutile titanium dioxide is photocatalytically inactive. However, with the method according to the invention, coatings are created that are photocatalytically active, and photocatalytically active particularly in visible light, despite a temperature well in excess of 700° C. and thus above the temperature at which titanium oxide is observed to change to the inactive rutile form in the otherwise conventional methods. Thus, the conversion of the nanocrystallites that is expected in view of the high temperature of the carrier gas and spray particles, does not occur; instead, the desired modification takes place at an even greater rate.

In an advantageous variation of the invention, the nanocrystalline agglomerates have a porosity from 250 to 600 $m^2/g$ (square metres per gram), preferably 280 to 450 $m^2/g$. The porosity is determined by BET measurement with nitrogen. Thus, in order for a photocatalytically active layer to be formed, a powder must be used with spray particles that have a porosity according to claim 1, preferably as described in the preceding. It follows that very agglomerates with very open pores mast be used.

The nanocrystalline agglomerates preferably have a hardness between 0.1 and 4 GPa (Giga Pascal), particularly preferably between 0.2 and 2 GPa, hardness being was determined by nanoindentation. Hardness of this order is both sufficient to enable the nanocrystalline agglomerates to be used for cold gas spraying, and at the same time it is also low enough to the requisite porosity.

Accordingly, a most particularly advantageous powder for use would be one that contains spray particles that include titanium dioxide in the anatase modification. Thus, the spray particles advantageously consist at least in part of nanocrystalline particles of titanium dioxide in the anatase modification. These advantageously have a size from 5 to 30 nanometres. These nanocrystalline particles were processed to form nanocrystalline agglomerates. The nanocrystalline particles are agglomerated to form nanocrystalline agglomerates, and these are advantageously sintered. Sintering makes the nanocrystalline agglomerates harder, so that they are able to withstand the stresses of cold gas spraying. The nanocrystalline agglomerates preferably have a size from 5 to 150 μm, particularly preferably from 10 to 30 μm. The nanocrystalline agglomerates satisfy the requirement with regard to porosity and hardness, and are both sufficiently porous to enable the nitrogen to interact with the spray particles and are still sufficiently hard so that they can be accelerated in the gas jet of the cold gas spraying installation. When they strike the object to be coated, a layer that is photocatalytically active in visible light is formed.

In the inventive method, therefore, parameters are selected in such manner that the spray particles striking the article to be coated have such a combination of speed and deformability that bonded, photocatalytically active coatings are formed. This is probably due to the fact that the spray particles break up in controlled manner upon impact and then form new bonds resulting in the formation of the coating. This formation of the coating is therefore attributable to the properties of the spray powder.

The spray powder particularly advantageously almost entirely of nanocrystalline agglomerates. Accordingly, no metallic or other additional components are added to the spray powder, so that the only substances present in the powder besides the nanocrystalline agglomerates are impurities. Additional components are not required, as the properties of the spray particles are such that they can be used as spray powder in a cold can spraying method.

In an advantageous embodiment of the invention, at least the photocatalytically active spray particles of nanocrystalline agglomerates are heated in a pre-chamber and/or in an extended convergent region by means of the carrier gas. A pre-chamber is a region that is located upstream of the convergent portion of the nozzle. An extended convergent region means that the narrowing of the nozzle toward the nozzle throat takes place over a long range. Such a cold gas spraying nozzle, which affords the particles a long residence time in the hot carrier gas, is described in EP 1 791 645, for example. In order to heat the nanocrystalline agglomerates using the carrier gas, at least the nanocrystalline agglomerates, in particular the entire spray powder, is injected before or into the leading region at the pre-chamber or the extended convergent region. At this point, if the cold gas spray gun is equipped with a pre-chamber or an extended convergent region, the spray particles will be particularly heated by the hot carrier gas, since the residence time in the hot gas is long, and heat be transferred particularly effectively to the spray particles. In the divergent region of the nozzle, that is to say downstream of the nozzle throat, the carrier gas cools down again as it expand, so the spray particles are no longer warmed up.

The method according to the invention may be used particular color advantageously to produce coatings having photocatalytic activity in visible light. When coatings also exhibit photocatalytic activity in visible light as well, the desired reactions for cleaning and disinfection for example take place when only visible light is present. UV light is thus not required. This is advantageous if the coatings are to be used in rooms and area that are lit artificially or into which daylight only enters through windows. Unlike daylight, this kind of light has only a very small UV component, or none at all. Consequently, the layers produced by the method according to the invention can also be used indoors.

In an advantageous embodiment of the invention, the coatings are at least 80 μm preferably at least 100 μm thick. Thus, it is possible to produce thick layers with the method according to the invention. The coatings advantageously have a thickness of at least 80 μm, preferably at least 100 μ. With the method according to the invention it is thus possible to produce thick coatings. Thick coatings are characterized in that they are thicker than one layer of spray particles. It follows that they have more than one layer of spray particles. For thick coatings, the ductility of the material pairing is obviously less important, and other bonding mechanisms are responsible for creating a bond with the substrate and consequently constructing the layer when the particles strike the substrate. If they are photocatalytically active in visible light, thick layers are bright yellow and can easily be recognized as such.

It should be noted that the coatings advantageously do not contain a metallic component. Moreover, the coatings advantageously contain no other components. Thus, with the method according to the invention it is therefore possible to produce a coating that, with the exception of the usual impurities, consists entirely of titanium dioxide.

Coatings which are prepared with the method according to the invention are also claimed. The coatings produced using the method according to the invention are characterized by the uniformity and layer thickness thereof. These properties, which are only manifested by the coatings produced with the method according to the invention, can be seen for example in the micrograph. In the optical microscope, film thickness and uniformity can be determined, but under a transmission electron microscope nanocrystalline primary particles are visible. The coating also exhibits the additional nitrogen that absorbed during the spraying process as well as the influence thereof on the surface structure and colour of the coating.

Advantageously, the coating has a photocatalytic activity in the visible light. The coatings are advantageously made of titanium dioxide.

Objects having a coating according to the invention are also claimed. Advantageously in this context, an adhesion layer is provided underneath the coating on the article that is to be coated, in order to ensure adhesion between the object to be coated and the coating itself. This helps to improve the durability of the coating. Thus, in an advantageous variation the method according to the invention is extended to such effect that an adhesion layer is applied before the cold gas spraying step.

BRIEF DESCRIPTION OF THE DRAWINGS

In the following, the method according to the invention will be explained in greater detail with reference to an exemplary cold gas spraygun as illustrated in the FIGURE.

DETAILED DESCRIPTION OF THE INVENTION

A cold gas spraygun is illustrated schematically and designated generally by 1 in the FIGURE.

Cold gas spraygun 1 is aimed at a substrate S, and has gas inlets 2, 3, through which a carrier gas G, particularly a heated stream of carrier gas G, may be provided. A gas heating device is provided upstream of spraygun 1 to heat carrier gas G. Additional gas inlets 3 may be used to set a can mixture and/or a temperature of gas stream G.

A powder inlet 4 is provided, by means of which spray powder P is fed into spraygun 1. To this end, a powder conveyor (not shown) is provided upstream of spraygun 1. Carrier gas G and the powder P enter a mixing chamber 5, which is disposed within multi-part housing 6 of spray gun. Multi-part housing 6 is shown partly opened.

A cold gas spray nozzle 10 has a nozzle inlet 11 on the spraygun side and a nozzle outlet 12 on the substrate side. A nozzle channel 13 extends between nozzle inlet 11 and nozzle outlet 12. Nozzle channel 13 includes a nozzle throat 14. The cross section of nozzle channel 13 tapers from the nozzle inlet to nozzle throat 14.

This is the convergent region. From nozzle throat 14 to nozzle outlet 12, nozzle channel 13 expands in the divergent region, no that a compressed and heated gas stream can be accelerated by means of the Laval effect. Carrier gas G with the correspondingly heated spray powder P is directed as a gas-powder mixture GP toward substrate S.

A spray powder having the advantageous properties described in the preceding is now introduced, into said cold gas spraygun 1 through powder inlet 4. In particular, the powder consists of nanocrystalline agglomerates of titanium dioxide in the anatase modification, which contains porous yet firmly has cohesive agglomerates. Said powder is heated in carrier gas G, which consists primarily of nitrogen, in the convergent region of the nozzle up to nozzle throat 14. In the divergent region of the nozzle, downstream of nozzle throat 14, the gas and powder are accelerated to sufficiently high velocities. The powder then impacts the substrate with a high level of kinetic energy.

On substrate S, the coating according to the invention forms in such manner that substrate S becomes the coated article or a part of the coated article.

What we claim is:

1. A method for cold gas spraying, in which a spray powder containing photocatalytically active spray particles is accelerated in a nozzle by means of a carrier gas and forms a coating upon impact with a substrate, characterized in that at least a part of the photocatalytically active spray particles consists of nanocrystalline agglomerates that have a porosity from 200 to 800 $m^2/g$, wherein the porosity is determined by a BET measurement using nitrogen and the nanocrystalline agglomerates have been sintered to a hardness of between 0.1 and 4 GPa, wherein the hardness is measured with a nanoindenter.

2. The method according to claim 1, characterized in that the carrier gas has a temperature higher than 400° C. upstream of the nozzle throat.

3. The method according to claim 1, characterized in that the carrier gas is selected from, the group consisting of nitrogen, helium and mixtures thereof.

4. The method according to claim 1, characterized in that the nanocrystalline agglomerates contain a compound selected from the group consisting of titanium dioxide ($TiO_2$), tungsten trioxide ($WO_3$), strontium titanate ($SrTiO_3$), tin dioxide ($SnO_2$), silicon carbide (SiC), sodium tantalum oxide (NaTaO), zinc oxide (ZnO), alpha ferric oxide ($\alpha\text{-}Fe_2O_3$), bismuth vanadate ($BiVO_4$), tantalum oxynitride (TaON), (III)tantalum(V)nitride ($Ta_3N_5$), indium tantalum(IV) oxide ($InTaO_4$) and indium niobium(IV)oxide ($InNbO_4$).

5. The method according to claim 1, characterized in that the nanocrystalline agglomerates have a porosity from 250 to 600 $m^2/g$.

6. The method according to claim 1, characterized in that at least the photocatalytically active spray particles of nanocrystalline agglomerates are heated in a pre-chamber or in an elongated convergent region by means of the carrier gas.

7. The method according to claim 1, characterized in that coatings having photocatalytic activity in visible light are produced.

8. The method according to claim 1, characterized in that the coating is at least 80 μm thick.

9. A coating prepared by the process according to claim 1.

10. The coating according to claim 9 that is photocatalytically active in visible light.

11. The coating according to claim 9 or consisting of titanium dioxide.

12. The coating according to claims 9 having a thickness which is greater than a layer of spray particles.

13. An object that has a coating according to claim 9.

14. The object according to claim 13, characterized in that an adhesive layer which is responsible for ensuring adhesion between the article to be coated and the coating is applied underneath the coating, on the article that is to be coated.

15. The method according to claim 2 characterized in that the carrier gas has a temperature higher than 800° C. upstream of the nozzle throat.

16. The method according to claim 2 characterized in that the carrier gas has a temperature higher that 900° C. upstream of the nozzle throat.

17. The method according to claim 4 characterized in that the compound is titanium dioxide in the anatase form.

18. The method according to claim 1 characterized in that the hardness is between 0.2 to 2 GPa wherein the hardness is measured with a nanoindenter.

19. The method according to claim 5 characterized in that the nanocrystalline agglomerates have a porosity from 280 to 450 $m^2/g$.

20. The method according to claim 8 characterized in that the coating is at least 100 μm thick.

21. The coating according to claim 12 characterized in that the thickness is at least 80 μm.

22. The coating according to claim 12 characterized in that the thickness is at least 100 μm.

* * * * *